(12) United States Patent
Bijawat et al.

(10) Patent No.: US 6,360,446 B1
(45) Date of Patent: Mar. 26, 2002

(54) LEVEL HAVING A LASER BEAM SOURCE

(75) Inventors: Viresh Bijawat, North Haven; David L. Wakefield, North Branford, both of CT (US)

(73) Assignee: The Stanley Works, New Britain, CT (US)

(*) Notice: Subject to any disclaimer, the term of this patent is extended or adjusted under 35 U.S.C. 154(b) by 0 days.

(21) Appl. No.: 09/324,120

(22) Filed: Jun. 2, 1999

Related U.S. Application Data (60) Provisional application No. 60/096,646, filed on Aug. 14, 1998.

(51) Int. Cl.[7] .............................. G01C 5/00; G01C 9/00
(52) U.S. Cl. ........................ 33/451; 33/286; 33/DIG. 21
(58) Field of Search .......................... 33/281, 282, 283, 33/285, 286, 381, 382, 383, 384, 385, 386, 387, 388, 389, 390, DIG. 21, 227, 228, 275 R, 276, 277, 278, 280, 451

(56) References Cited

U.S. PATENT DOCUMENTS

| | | | |
|---|---|---|---|
| 2,695,949 A | 11/1954 | Ashwill ..................... 240/6.44 |
| 3,820,249 A | 6/1974 | Stone .......................... 33/347 |
| 3,897,637 A | 8/1975 | Genho ......................... 33/227 |
| 3,909,952 A | 10/1975 | Lagasse ....................... 33/227 |
| 4,031,629 A | 6/1977 | Paluck ......................... 33/290 |
| 4,123,849 A | * 11/1978 | Maughmer .................... 33/320 |
| 4,168,578 A | 9/1979 | VanderWerf ................... 33/371 |
| 4,265,027 A | 5/1981 | Burniski ...................... 33/291 |
| D261,369 S | 10/1981 | Smith ......................... D10/69 |
| 4,365,241 A | 12/1982 | Morishita .................... 340/636 |
| 4,448,528 A | 5/1984 | McManus ..................... 356/250 |
| 4,473,957 A | * 10/1984 | Faulkner ...................... 33/666 |
| 4,590,682 A | 5/1986 | Koch .......................... 33/383 |
| 4,647,208 A | * 3/1987 | Bieman ....................... 356/375 |
| 4,700,479 A | 10/1987 | Saito et al. ................... 33/366 |
| 4,720,920 A | 1/1988 | Tudek ......................... 33/366 |
| 4,841,136 A | 6/1989 | Nakayama et al. ........... 250/231 |
| 4,852,265 A | 8/1989 | Rando et al. .................. 33/227 |
| 4,854,704 A | 8/1989 | Funazaki et al. ............. 356/250 |
| 4,912,662 A | 3/1990 | Butler et al. ................ 364/559 |
| 4,912,851 A | 4/1990 | Rando et al. .................. 33/227 |
| 4,993,161 A | 2/1991 | Borkovitz ..................... 33/291 |
| 5,012,585 A | 5/1991 | DiMaggio ..................... 33/286 |
| 5,103,569 A | * 4/1992 | Leatherwood ................ 33/379 |
| 5,121,188 A | 6/1992 | Patridge et al. .............. 357/74 |
| D332,226 S | 1/1993 | Hutchins et al. ............. D10/69 |

(List continued on next page.)

FOREIGN PATENT DOCUMENTS

| | | |
|---|---|---|
| GB | 2319084 | 5/1998 |
| WO | WO 91/02217 | 2/1991 |

*Primary Examiner*—Christopher W. Fulton
(74) *Attorney, Agent, or Firm*—Pillsbury Winthrop LLP (57) ABSTRACT

A level comprises a body, a body orientation detector, a laser beam source, a laser beam configuring lens, and a manually engageable lens switch. The body orientation indicator is carried by the body and constructed and arranged to indicate an orientation of the body. The laser beam source is carried by the body and constructed and arranged to emit a laser beam from the body to a location on a surface remote from the body, the laser beam being directed at a predetermined orientation with respect to the body to interrelate the orientation of the body with respect to the location on the surface remote from the body. The laser beam configuring lens assembly is carried by the body and movable between a first position and a second position with respect to the laser beam source. The laser beam configuring lens assembly splits the laser beam emitted by the laser beam source into a cross-hair beam configuration when the laser beam configuring lens is in the first position, and enables the beam to be transmitted as a point beam that projects a point of illumination onto the remote surface when the laser beam configuring lens assembly is in the second position. The manually-engageable lens switch is carried by the body and coupled to the laser beam configuring lens assembly. The lens switch is manually movable to move the laser beam configuring lens assembly between the first and second positions thereof.

12 Claims, 7 Drawing Sheets

U.S. PATENT DOCUMENTS

| | | | |
|---|---|---|---|
| 5,212,889 A | 5/1993 | Lysen | 33/286 |
| 5,249,365 A * | 10/1993 | Santiago | 33/374 |
| 5,367,779 A | 11/1994 | Lee | 33/290 |
| 5,394,616 A | 3/1995 | Claxton | 33/275 |
| 5,402,226 A | 3/1995 | Matthews et al. | 356/141.3 |
| 5,519,942 A * | 5/1996 | Webb | 33/290 |
| 5,531,031 A * | 7/1996 | Green | 33/365 |
| 5,539,990 A | 7/1996 | Le | 33/283 |
| 5,572,797 A | 11/1996 | Chase | 33/286 |
| 5,727,880 A * | 3/1998 | Hollander et al. | 374/121 |
| 5,748,306 A | 5/1998 | Louis | |
| 5,782,003 A * | 7/1998 | Bozzo | 33/291 |
| 5,788,359 A | 8/1998 | Halsey et al. | |
| 5,790,248 A * | 8/1998 | Ammann | 356/250 |
| 5,838,431 A * | 11/1998 | Hara et al. | 356/138 |
| 5,864,956 A * | 2/1999 | Dong | 33/227 |
| 5,872,657 A * | 2/1999 | Rando | 359/629 |
| 5,940,978 A * | 8/1999 | Wright et al. | 33/381 |
| 6,009,630 A * | 1/2000 | Rando | 33/365 |
| 6,062,702 A * | 5/2000 | Krietzman | 362/158 |
| 6,065,217 A * | 5/2000 | Dong | 33/290 |
| 6,144,787 A * | 11/2000 | Johnston et al. | 385/31 |

* cited by examiner

LEVEL HAVING A LASER BEAM SOURCE

This application claims the benefit of U.S. Provisional Application No. 60/096,646, filed Aug. 14, 1998.

FIELD OF THE INVENTION

The present invention is related to a level having a laser beam source which projects a selectively configurable beam onto a surface remote from the level for interrelating the orientation of the level with respect to a location on the remote surface.

BACKGROUND OF THE INVENTION

The prior art literature describes levels having a laser beam generator mounted therein for projecting a light beam to a surface remote from a reference surface on which the level is placed so as to interrelate the orientation or position of the reference surface with the remote surface. Levels with built-in lasers are also commercially available. A limitation of many such prior art levels with built-in lasers is that the laser emits a collimated beam that projects only a point of light onto the remote surface. A simple point of light projected onto a remote surface transfers relatively little information about the reference surface. For the most part, a point of light only transfers, or interrelates, the position of the reference surface onto the remote surface; it does not transfer, or interrelate, the orientation of the reference surface with respect to the remote surface. For example, a point of light will not provide a reference that indicates an orientation that is parallel or perpendicular with respect to the orientation of the reference surface engaged by the body of the level.

For example, U.S. Pat. No. 3,897,637 describes a level which carries a laser internally thereof and which includes a beam splitter which splits the beam from the laser into two or more beams oriented transversely (e.g., orthogonally) to each other to project a point of light onto different remote surfaces oriented transversely to each other.

U.S. Pat. No. 5,531,031 describes a level having a laser carried internally thereof in a rotatable mounting so that a laser beam can be emitted from the level at a user-selected, variable angle to project a point of light to a desired remote surface and at a selected angle with respect to the level.

While these levels may provide a point of light reference on a remote surface and may be capable of projecting that point of light at variable angles with respect to the level or to project multiple points of light simultaneously, they do not transfer the orientation of the level or the reference surface onto the remote surface.

It has been known that the orientation of the reference surface can be projected onto a remote surface by configuring the laser beam as a cross-hair beam with transversely intersecting lines of light being projected onto the remote surface. One line can, for example, be oriented so as to be parallel to the reference surface on which the level is resting and the intersecting line can be oriented so as to be perpendicular to the reference surface. The position of the level and reference surface on which the level rests is transferred by the point of intersection of the lines.

Although a laser beam configured as a cross-hair is desirable and advantageous in many instances, there are times when it is unnecessary and undesirable, and a simple point beam is preferable. For example, the more concentrated light of a point beam can be projected for greater distances in comparison with a split beam.

Heretofore, laser levels having cross-hair beam splitting capability have required disassembly in order to reconfigure the emitted laser beam as a point beam and vice versa. For example, to achieve a split beam from a point beam source, a laser lens housing assembly must be opened and a beam splitting lens inserted therein. To resume point beam projection, the housing must be again opened and the beam-splitting lens removed. Therefore, a need exists for not only a level having a laser projecting a beam that can be configured as a cross-hair beam, but also one that can also selectively project a point light beam if desired, without requiring disassembly of the laser lens assembly.

SUMMARY OF THE INVENTION

It is an object of the invention to provide a level that includes a laser light source that can be easily converted between a point beam and a cross-hair beam. To achieve this object, the level of the present invention comprises a body having a body surface constructed and arranged to be engaged with a reference surface, a body orientation indicator, a laser beam source, a laser beam configuring lens, and a manually engageable lens switch. The body orientation indicator is carried by the body and is constructed and arranged to indicate an orientation of the body and hence an orientation of the reference surface when the body surface is engaged therewith. The laser beam source is carried by the body and is constructed and arranged to emit a laser beam from the body to a location on a surface remote from the body, the laser beam being directed at a predetermined orientation with respect to the body to interrelate the orientation of the body, and hence the orientation of the reference surface with which the body surface is engaged, with respect to the location on the surface remote from the body. The laser beam configuring lens assembly is carried by the body and movable between a first position and a second position with respect to the laser beam source. The laser beam configuring lens assembly splits the laser beam emitted by the laser beam source into a cross-hair beam configuration when the laser beam configuring lens is in the first position, and enables the beam to be transmitted as a point beam that projects a point of illumination onto the remote surface when the laser beam configuring lens assembly is in the second position. The manually-engageable lens switch is carried by the body and is coupled to the laser beam configuring lens assembly. The lens switch is manually movable to move the laser beam configuring lens assembly between the first and second positions thereof.

Other objects, features, and characteristics of the present invention, as well as the methods of operation of the invention and the function and interrelation of the elements of structure, will become more apparent upon consideration of the following description and the appended claims with reference to the accompanying drawings, all of which form a part of this disclosure, wherein like reference numerals designate corresponding parts in the various figures.

DETAILED DESCRIPTION OF THE PREFERRED EMBODIMENT

Figure 9A:
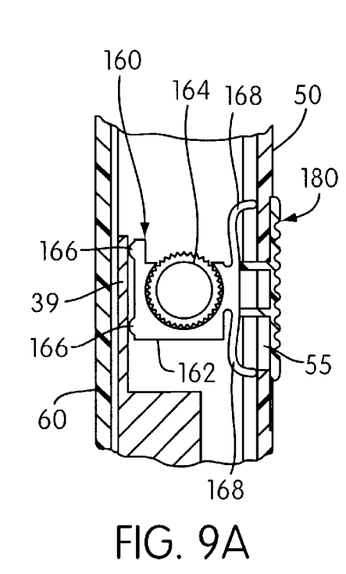
FIG. 9A is a cross-sectional view along the line IX—IX of FIG. 2 showing a laser beam configuring lens assembly in a first, laser beam-altering position.
Figure 9B:
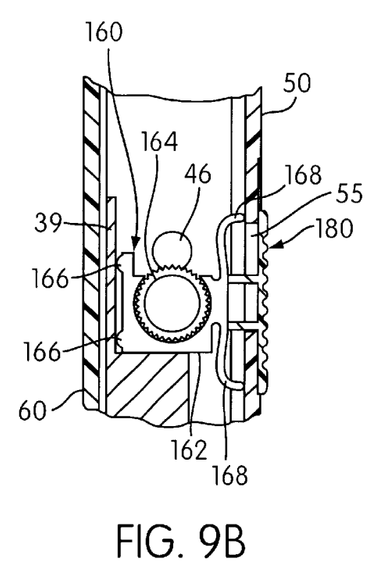
FIG. 9B is a cross-sectional view along the line IX—IX of FIG. 2 showing the laser beam configuring lens assembly in a second, non-laser beam-altering position.

A level constructed in accordance with the concepts of the present invention is indicated generally by reference number 10 in the figures. In the illustrated embodiment, as shown, for example, in FIGS. 1–5 and 10, the level 10 includes a body 20 with two fixed body orientation indicators 80, 82 positioned along a top edge of the body 20 and a variable-position body orientation indicator 100 positioned in a middle portion of the body 20. A laser module 130 carried inside the body 20 (see FIG. 10) emits a laser beam through aperture 74, is powered by batteries 33 housed inside the body 20, and is turned ON and OFF by a switch provided in the end of a battery tube cover 34. As shown in FIGS. 9A and 9B, a laser beam configuring lens assembly 160 is carried inside the body 20 so as to be protected from breakage and direct manual contact. The lens assembly is positioned forwardly of the laser module 130 between the module 130 and the aperture 74 to permit selective configuring of the beam emitted by the laser module 130 by means of a manually-engageable lens switch 180 coupled to the laser beam configuring lens assembly 160.

Figure 10:
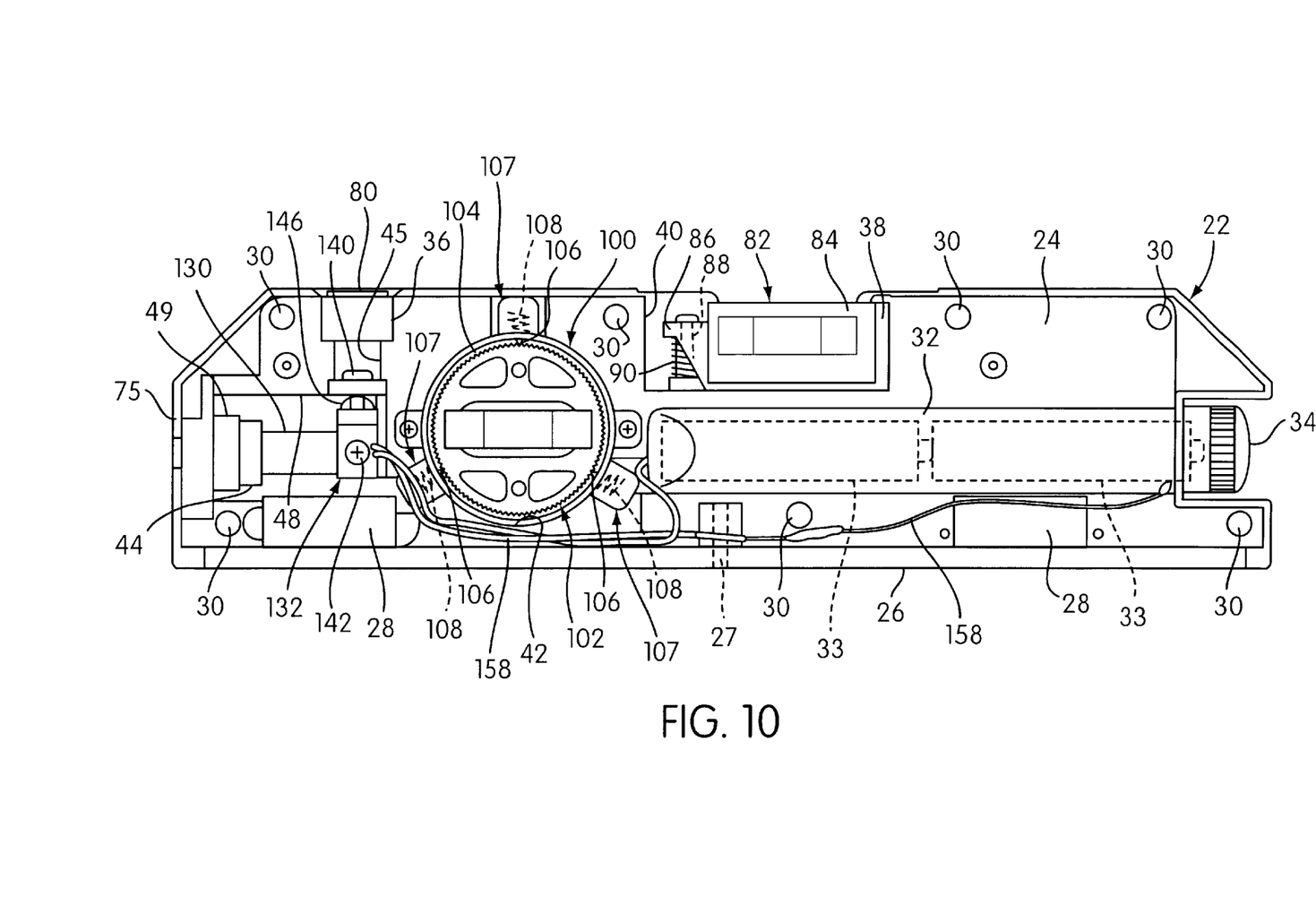
FIG. 10 is a back-elevation of the level with a back cover of the body of the level removed to expose the interior components of the level.

The body 20 generally includes an inner block 24, preferably composed of a strong and light-weight material, such as zinc or aluminum (see FIG. 10), which is covered by mating front and back covers 50, 60, respectively. As shown in FIG. 10, in which front cover 60 is removed to expose inner block 24 of body 20, inner block 24 functions as a main structural frame member to which all other components of the level 10 are attached. The body 20 presents a flat, elongated body surface 26 which, in the illustrated embodiment, is on the bottom of body 20 and which functions to engage a reference surface as will be described below. A threaded aperture 27 (see also FIG. 5) may be provided in the bottom central portion of the bottom surface 26. The purpose of the threaded aperture is for attaching the level 10 to a tri-pod. Magnets 28 may be provided inside the inner block 24 so as to be generally flush with the body surface 26 for releasably securing the level 10 to a ferromagnetic surface. The inner block 24 also provides a power-pack chamber 32, which, in the preferred embodiment, comprises a battery tube for accommodating batteries 33 disposed therein in end-to-end alignment. A battery tube cover 34 is threadedly engaged with the inner block 24 so as to selectively close off the power-pack chamber 32.

The front and back covers 50, 60 are preferably formed of molded plastic and are connected to each other and the inner block 24 by means of fasteners 31 extending through the back cover 60, through connector apertures 30 formed in the inner block 24, and into fastener-receiving bosses (not shown) molded into the front cover 50.

Figure 2:
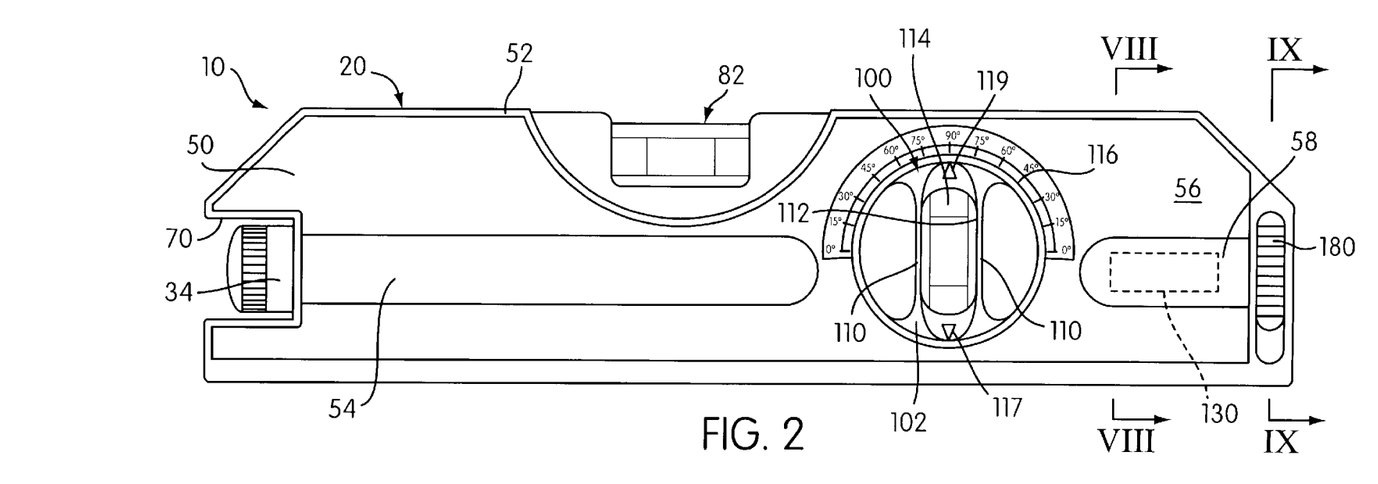
FIG. 2 is a front-elevation of the level.

As shown in FIG. 2, the front cover 50 has a generally recessed middle portion 56 with a peripheral rib 52 having straight extents at portions of the periphery of the cover 50 and an arcuate extent below the fixed body orientation indicator 82. A raised, elongated portion 54 having an arcuate transverse cross-sectional shape provides an interior cavity that accommodates the power-pack chamber 32 of the inner block 24, and a raised portion 58 having an arcuate transverse cross-sectional shape that accommodates the laser module 130.

Figure 3:
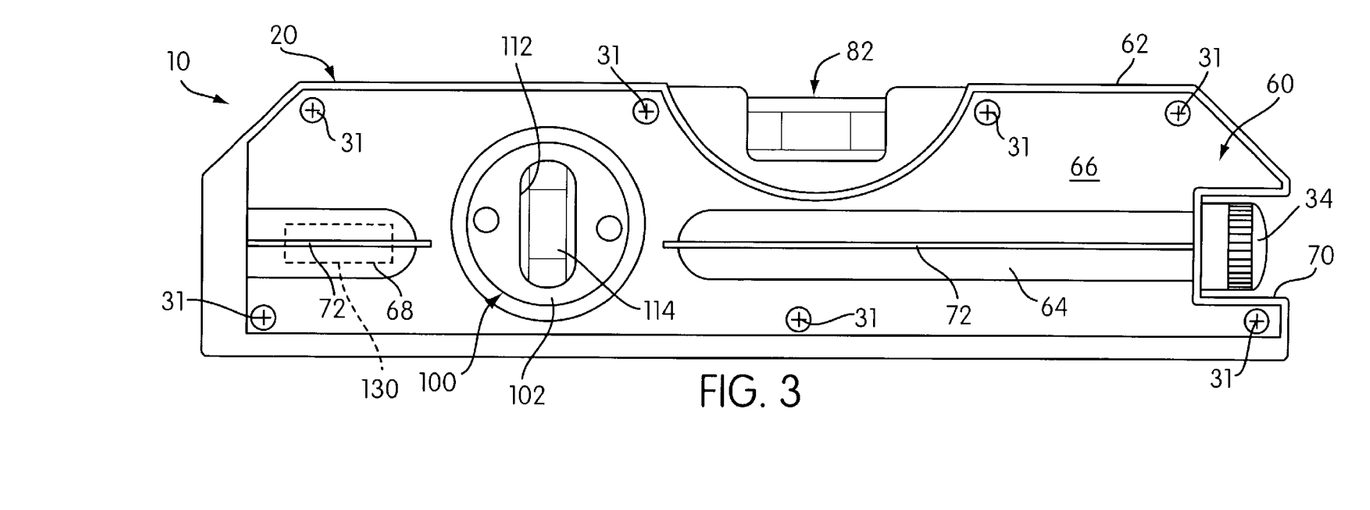
FIG. 3 is a back-elevation of the level.
Figure 4:
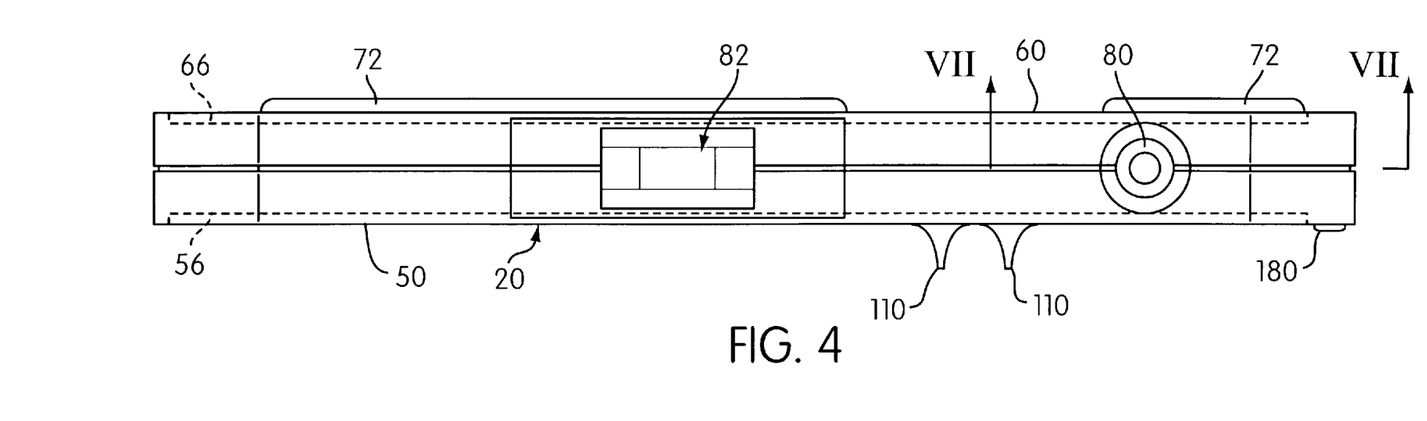
FIG. 4 is a top-plan view of the level.
Figure 5:
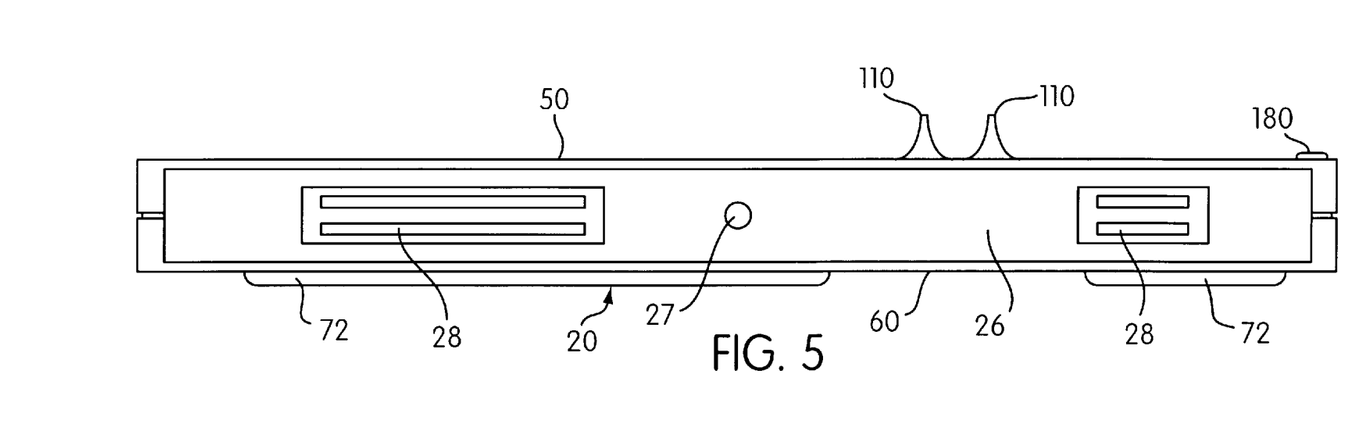
FIG. 5 is a bottom-plan view of the level.

As shown in FIG. 3, the back cover 60 also has a recessed middle portion 66 with a peripheral rib 62 having straight extents at portions of the periphery of the back cover 60 and an arcuate extent below the fixed body orientation indicator 82. Back cover 60 also includes an elongated raised portion 64 having an arcuate transverse cross-sectional shape and defining an interior cavity which accommodates the power-pack chamber 32. In addition, the back cover 60 also includes an elongated raised portion 68 having an arcuate transverse cross-sectional shape and providing an interior cavity which accommodates the laser module 130.

Figure 1:
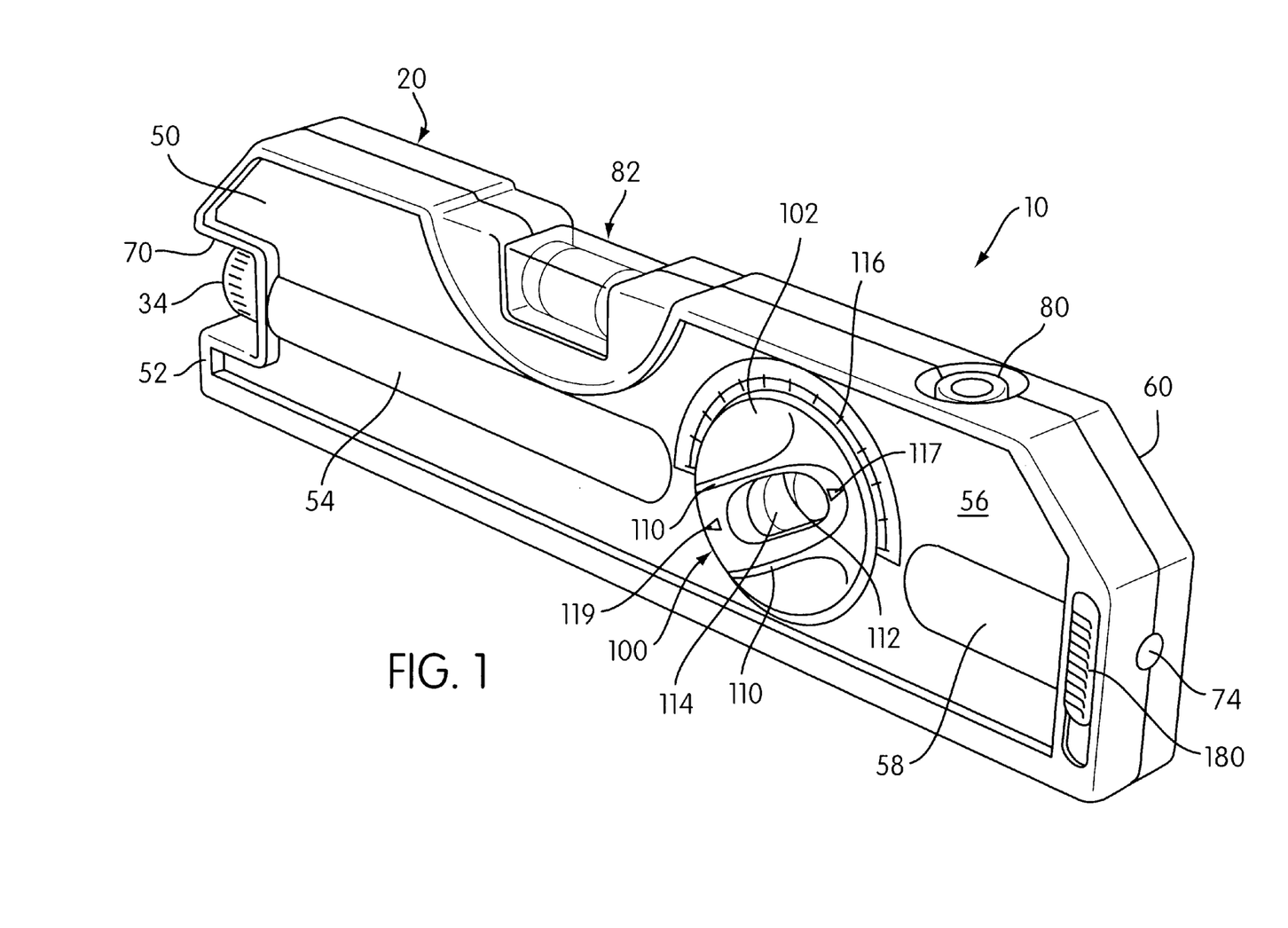
FIG. 1 is a perspective view of a level having a laser beam source in accordance with the principles of the present invention.
Figure 6:
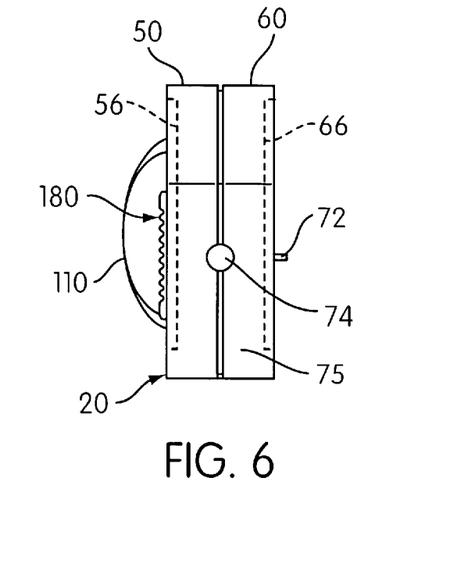
FIG. 6 is a right-side elevation of the level.

The front and back covers 50 and 60 cooperate in a mating fashion to provide a decorative and functional cover for the body 20 of the level 10 and cover all surfaces of the inner block 24 except for the body surface 26. As shown in FIG. 6, the mating covers 50 and 60 define a laser aperture 74 in one end of the body 20 and, as shown in FIGS. 1–3, also define a rectangular notch 70 in the opposite end of the body 20 which accommodates the battery tube cover 34. The back cover 60 also presents an alternative body surface in the form of a flange 72 extending transversely from a side surface of the cover 60. The bottom surface of flange 72 is parallel to body surface 26 of the body. In the preferred embodiment, the flange 72 is provided in two co-planar portions extending transversely from the raised portions 64 and 68. The flange 72 can be placed on a reference surface, such as piping, tubing, or other structure, to enable the user to determine the orientation thereof.

The body orientation indicators 80, 82, and 100 are constructed and arranged to indicate the orientation of the body 20. More particularly, the body orientation indicators comprise liquid containing vials for indicating whether the body surface 26 or flange 72, and hence a reference surface with which the body surface 26 or flange 72 is engaged, is in a level and/or plumb orientation with respect to a preferred orientation of one or more of the vials. In the preferred embodiment, the level 10 includes three bubble vials as will be described.

The fixed body orientation indicator 80 preferably comprises a bull's eye vial provided along the longitudinal center line of a top surface of the body 20. The bull's eye vial 80 is housed within an integrally formed tubular housing 36 provided in the inner block 24 of the body 20 and is visible through an opening formed in the cooperating front and back covers 50, 60. The top bull's eye vial 80 is constructed to indicate that the body surface 26 or flange 72 of the level 10 is in a horizontally level orientation when a gas bubble within the vial is centered within a circular bull's eye in the top lens of the vial. More particularly, the bull's eye vial 80 is oriented with respect to the body surface 26 and flange 72 of the body 20 so that the bubble within the vial will be centered within the bull's eye when the body surface 26 or flange 72 is placed on a reference surface that is horizontally level in all respects (360°) so that the body surface 26 or flange 72 is horizontally level.

The fixed body orientation indicator 82 preferably comprises a barrel vial provided in a top portion of the body 20. As shown in FIG. 10, the fixed barrel vial 82 is disposed within a rectangular opening 40 formed in the inner block 24 and is secured in a cantilever fashion by rigidly mounting one end 84 of the vial into a holding structure 38 formed on the inner block 24. A bracket structure 86 presenting a shelf extends from an opposite end of the vial 82 and provides a fastener hole through which a threaded fastener 88 may be inserted and turned into the inner block 24. A spring 90 is provided on a lower portion of the fastener 88 between the inner block 24 and the bracket 86. Accordingly, the orientation of the vial 82 can be adjusted by turning the fastener 88 in one direction or the other. As known in the art, in its properly adjusted orientation, the vial 82 provides a level indication when body surface 26 or flange 72 of body 20 is disposed in a level condition (e.g., resting on a level reference surface) in the longitudinal body direction. The front and back covers 50 and 60 define a rectangular opening so as to permit the fixed barrel vial 82 to be viewed from the top and the opposite sides of the body 20.

As noted above, the barrel vial of the fixed body orientation indicator 82 is constructed and arranged to indicate when the body surface 26 or flange 72 is in a level orientation with respect to the longitudinal body direction when a gas bubble within the vial is centered between two spaced rings extending about the perimeter of the vial. More particularly, the barrel vial of the fixed body orientation indicator 82 is oriented with respect to the body surface 26 so that the bubble within the vial will be centered between the spaced rings when the body surface 26 or the flange 72 is placed on a reference surface that is horizontally level in the longitudinal body direction. The body surface 26 and the top and bottom surfaces of the flange 72 are flat body surfaces that can be engaged with a reference surface so that the emitted laser beam can project information about the reference surface onto a remote surface. The present invention contemplates that only one body surface need be provided (e.g., the flange 72 can be omitted). When properly adjusted with respect to body 20, the vial 82 can also be used to indicate when a laser beam emitted from laser module 130 is level.

The level 10 also preferably includes a variable-position body orientation indicator 100, which, in the preferred embodiment, comprises a rotating vial assembly. In accordance with the preferred embodiment, the variable-position body orientation indicator 100 includes a circular housing 102 disposed within a circular opening 42 formed within the inner block 24 of the body 20. A plurality of teeth 104 are formed about the outer periphery of the circular housing 102. Spring-biased detent mechanisms 107 are provided about the outer periphery of the opening 42. In a preferred embodiment, three 120°-spaced mechanisms 107 are provided. The spring-biased detent mechanisms 107 include a protruding detent 106 that is urged outwardly by a spring 108. The detents 106 engage the teeth 104 of the circular housing 102 to releasably hold the housing 102 in a preferred angular position.

A pair of laterally extending gripping portions 110 extend outwardly from the housing 102 to permit manual gripping and rotating of the housing 102. A centrally located elongated opening 112 provided in the housing 102 accommodates a barrel vial 114 securely mounted therein. An angular scale 116 may be applied to the outer surface of one of the covers 50 or 60, and pointers/indicators 117, 119 aligned with the opposite ends of vial 114 may be provided on the housing 102. In the illustrated embodiment, the scale 116 is provided on the front cover 50. The angle of a surface can be determined or verified by placing the bottom surface 26 or the leveling flange 72 onto the surface and rotating the housing 102 of vial assembly until the gas bubble within the barrel 114 is centered and reading the indicated angle off of the scale 116. In the embodiment shown, the scale 116 varies from between 0° to 90° and back to 0° as shown, enabling the vial 114 to be rotated in either direction and still provide the angular indication.

Although the preferred embodiment of the level 10 shown in the drawings includes two fixed body orientation indicators 80, 82 and a variable position orientation indicator 100, it is within the contemplated scope of the present invention to provide more or less than three body orientation indicators in any combination of fixed and/or variable-position indicators.

Figure 7:
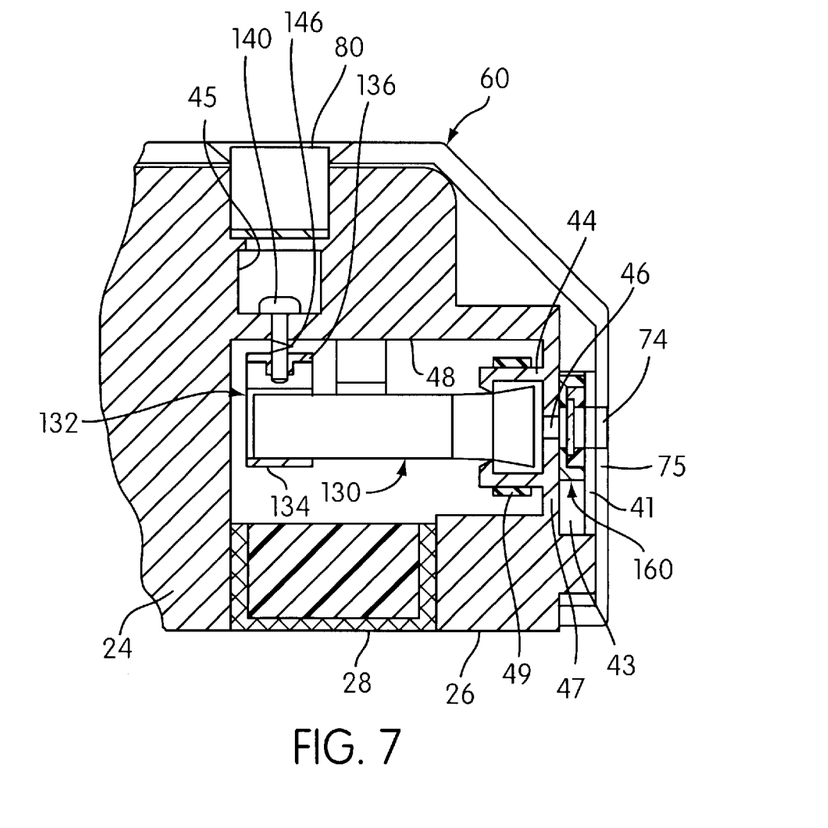
FIG. 7 is a partial cross-sectional view along line VII—VII in FIG. 4 illustrating a bull's eye level vial, a laser module, a moveable laser beam configuring lens assembly, and a bottom magnet of the level.
Figure 8:
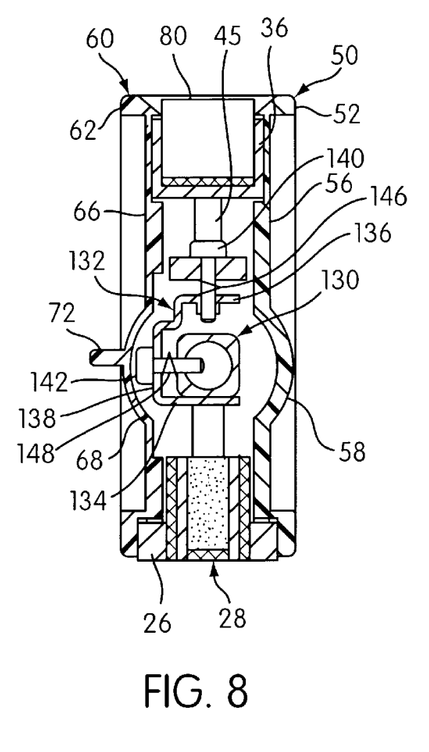
FIG. 8 is a cross-sectional view along the line VIII—VIII in FIG. 2 illustrating a bull's eye level vial, a laser module and module hanger, and a magnet of the level.

The laser module 130 is disposed within an opening 48 formed in the inner block 24. One end of the laser module 130 is supported in a mounting structure 44 integrally formed in the inner block 24 and is secured within mounting structure 44 by an elastic band 49 (e.g., rubber) wrapped around the mounting structure 44 and the end of the module 130. An aperture 46 is provided in the end of the inner block 24 (see FIGS. 7 and 9B) through which a laser beam is emitted by the laser module 130. The opposite end of the laser module 130 is supported by a module hanger 132. The module hanger 132 includes a lower transverse shelf 134, an upper transverse shelf 136, and a connecting sidewall 138. An opening 45 is provided in the inner block 24 below the circular vial mounting structure 36. A threaded fastener 140 extends through an aperture formed at the bottom of the opening 45 into the upper transverse shelf 136 of the hanger 132 to support the hanger 132 within the opening 48. A leaf-spring 146 is provided between the top of the upper transverse shelf 136 and the inner wall defining the opening 48. The laser module 130 is secured within the hanger 132 by means of a threaded fastener 142 extending through the connecting sidewall 138 into the module 130 with a leaf-spring 148 disposed between the sidewall 138 and the module 130. The orientation of the laser module 130 can be adjusted by turning one or both fasteners 140, 142. The laser module 130 is connected to the power-pack chamber 32 by wires 158 extending from the power-pack chamber 32 to the module 130. In the preferred embodiment, the end of the battery tube cover 34 provides a push-button switch for completing a circuit from the power-pack chamber 32 to the laser module 130 to energize the laser. The laser housed within the laser module 130 is preferably a conventional diode laser.

As shown primarily in FIGS. 9A and 9B, a laser beam configuring lens assembly 160 is disposed in front of the laser module 130 between an end-wall 47 of the inner block 24 and an end-wall 75 defined by the front and back covers 50, 60. The laser beam configuring lens assembly 160 comprises a lens holder 162 in which is mounted a cross-hair lens 164. The lens holder 162 is slidably disposed in a slot defined between walls 41 and 47 of the inner block 24 and is maintained in a transversely centered position by dimples 166 which contact an outer wall 39 of the inner block 24 and a pair of flexible tangs 168 which bear against an interior wall of the front cover 50.

A manually-engageable lens switch 180 extends through a slot 55 formed in the front cover 50 and is connected to the laser beam configuring lens assembly 160 so as to permit the lens assembly 160 to be moved between a first position shown in FIG. 9A in which cross-hair lens 164 is disposed in front of laser aperture 46 and a second position shown in FIG. 9B in which the cross-hair lens 164 is moved away from laser aperture 46 and out of the path traveled by a beam emitted by the laser module 130. The cross-hair lens 164 is a beam-splitting lens constructed and arranged to split a laser beam into a cross-hair configuration. More particularly, as shown in FIG. 11B, when the laser beam configuring lens assembly is in the first position, the laser beam 131 enters the cross-hair lens 164 and is split into split-beam 133 so as to project a cross-hair pattern 202 onto a surface remote from the level 10. The cross-hair pattern 202 preferably includes a center point 208 and intersecting lines 204 and 206 which are preferably orthogonal (90°) with respect to each other. Moreover, line 204 is preferably perpendicular to the plane of surface 26 and line 206 would thus, be parallel to surface 26. It is also preferred for a second pair of intersecting lines 205, 207 to bisect each of the 90° angles between lines 204 and 206, so that a 45° spacing exists between adjacent lines of the cross-hair as shown.

In the context of the present invention, the term "line" in reference to the light patterns forming a cross-hair pattern may mean a continuous line of light, an aligned series of light points or dashes, or combinations of points, dashes, and or continuous lines.

Figure 11A:
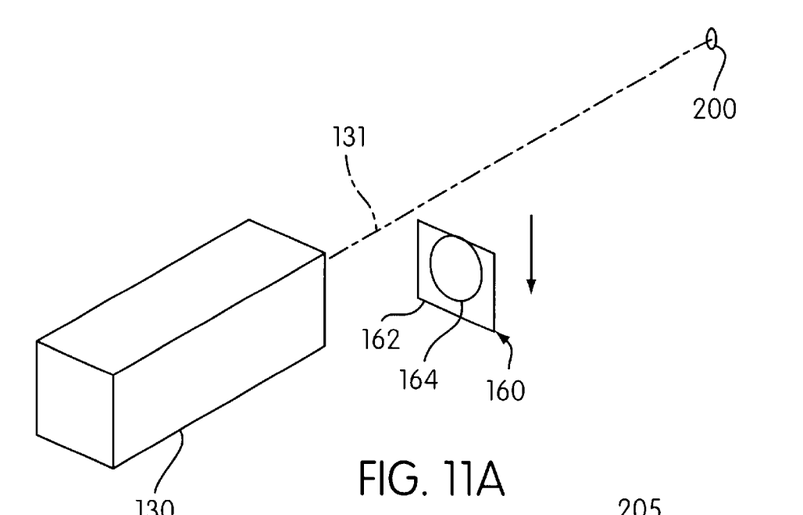
FIG. 11A is a schematic perspective view showing a laser beam module and a laser beam configuring lens assembly in a non-laser beam-altering position.
Figure 11B:
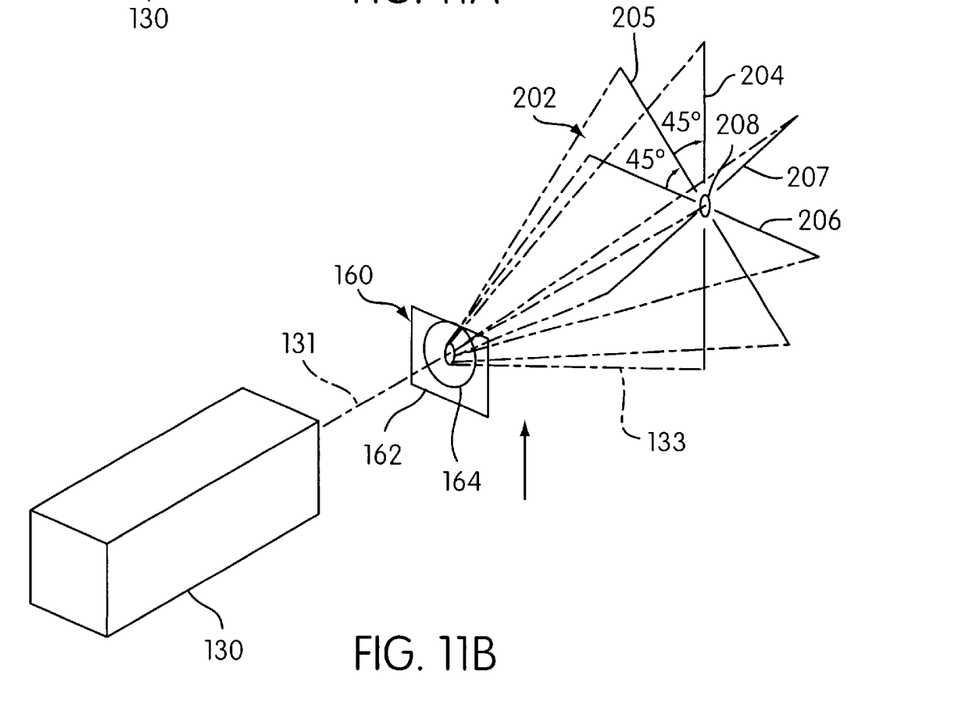
FIG. 11B is a schematic perspective view of the laser module and the laser beam configuring lens assembly in a beam-altering position in which a laser beam is split into a cross-hair pattern projected onto a surface.

On the other hand, when the laser beam configuring lens assembly 160 is moved to the second position shown in FIG. 11A, the laser beam 131 is transmitted undisturbed to project or illuminate a point 200 on a remote surface. The location of point 200 corresponds to the location of center point 208 of the cross-hair pattern 202.

Although no lens is provided through which the beam 131 passes when the assembly 160 is in the second position, a second transmitting lens, such as a plain transparent lens, a focusing lens, or a collimating lens may be included in the laser beam configuring lens assembly 160, so that the beam 131 passes through the second lens when the assembly 160 is in the second position.

The level 10 can be operated as follows: The level can be placed with either the body surface 26 or the flange 72 disposed on a reference surface, and the orientation of the body 20, and thereby the orientation of the reference surface on which the level is resting, can be determined or verified by one or more of the body orientation indicators 80, 82, and 100, as described above. Alternatively, the level 10 may be attached to a tri-pod at aperture 27, and a preferred orientation of the level 10, as indicted by one or more of the body orientation indicators 80,82, and 100, can be established. The laser aperture 74 is pointed at a surface remote from the level 10 and the laser module 130 is switched on to interrelate the position and orientation of the level 10 on the remote surface by projecting the position and orientation of the level 10 onto the surface. For example, the height of a reference surface above a floor can be projected onto a wall that is spaced from the surface by placing the level 10 on the surface and projecting the laser beam onto the wall. Parallel and perpendicular orientations with respect to the surface can be projected onto the wall by manually selecting a cross-hair configuration with switch 180 to project a cross-hair pattern 202 onto the wall.

Additional advantages and modifications will readily occur to those skilled in the art. Therefore, the invention is not limited to the specific details and representative embodiments shown and described herein. Accordingly, various modifications to the embodiments may be made without departing from the spirit or scope of the invention as described by the appended claims.

Furthermore, it should be noted that those of the appended claims which do not include language in the 'means for performing a specified function' format permitted under 35 U.S.C. §112(¶6), are intended to not be interpreted under 35 U.S.C. §112(¶6) as being limited to the structure, material, or acts described in the present specification and their equivalents.

What is claimed is:

1. A level comprising:
    a body having a body surface constructed and arranged to be engaged with a reference surface;
    a body orientation indicator carried by said body and constructed and arranged to indicate an orientation of said body, and hence an orientation of the reference surface when the body surface is engaged therewith;
    a laser beam source carried by said body and constructed and arranged to emit a laser beam from said body to a location on a surface remote from said body, the laser beam being directed at a predetermined orientation with respect to said body to interrelate the orientation of said body, and hence the reference surface engaged with the body surface, with respect to the location on the surface remote from said body;
    a laser beam configuring lens assembly carried by said body and moveable between a first position and a second position with respect to said laser beam source, said laser beam configuring lens assembly being constructed and arranged to split the laser beam emitted by said laser beam source into a cross-hair beam configuration when said laser beam configuring lens assembly is in said first position, and to enable said laser beam to be transmitted as a point beam that projects a point of illumination onto a remote surface when said laser beam configuring lens assembly is in said second position, said cross-hair beam including first and second elongated beam portions oriented with respect to said body surface such that said first elongated beam portion is disposed generally perpendicular to said reference surface when said body surface is engaged with said reference surface and said second elongated beam portion is disposed generally parallel to said reference surface when said body surface is engaged with said reference surface; and
    a manually engageable lens switch carried by said body and coupled to said laser beam configuring lens assembly, said manually engageable lens switch being manually movable to move said laser beam configuring lens assembly between said first and second positions thereof.

2. A level according to claim 1, wherein said laser beam configuring lens assembly is carried internally of said body.

3. A level according to claim 1, wherein said body is elongated and wherein said body surface comprises an elongated flat surface, and wherein said body orientation indicator comprises a liquid-containing vial constructed and arranged to indicate whether said flat surface is level in a direction of elongation.

4. A level according to claim 3, wherein said liquid-containing vial is constructed and arranged to indicate whether said flat surface is in a horizontally level orientation.

5. A level according to claim 1, wherein said body orientation indicator comprises a liquid-containing vial fixed within a mounting structure that is coupled to said body and constructed and arranged to be manually rotated to a user-selected angle to indicate an orientation of said body with respect to said user-selected angle.

6. A level according to claim 1, wherein said body is elongated and wherein said body surface comprises an elongated flat surface, and wherein said body orientation indicator comprises a first liquid-containing vial provided in a top portion of said body and constructed and arranged to indicate whether said flat surface is level in a direction of elongation, a second liquid-containing vial provided in a top portion of said body and constructed and arranged to indicate whether said flat surface is in a horizontally level orientation, and a third liquid-containing vial fixed within a mounting structure that is coupled to said body and constructed and arranged to be manually rotated to a user-selected angle to indicate an orientation of said body with respect to said user-selected angle.

7. A level according to claim 1, wherein said body is elongated and wherein said body surface comprises an elongated flat surface, and wherein said body further includes a second body surface formed on a leveling flange extending laterally from a side surface and being elongated in the direction of elongation of said body, said leveling flange being arranged in parallel to said flat surface.

8. A level according to claim 1, wherein said body has a threaded aperture formed therein constructed and arranged to permit said level to be secured to a tri-pod.

9. A level according to claim 1, wherein said body is elongated and includes an elongated flat surface, and wherein said laser beam source is constructed and arranged to emit the laser beam from said body along an axis that is parallel to the direction of elongation.

10. A level according to claim 9, wherein said laser beam configuring lens assembly is constructed and arranged to split the laser beam into a cross-hair light pattern having a first line arranged parallel to said flat surface and a second line intersecting said first line and arranged perpendicular to said flat surface, the point of intersection of said first and second lines being projected from said body along an axis that is parallel to the direction of elongation.

11. A level according to claim 10, wherein said laser beam configuring lens assembly is constructed and arranged to split the laser beam into a cross-hair light pattern having intersecting lines bisecting an angle between said first and second lines.

12. A level according to claim 1, wherein said laser beam source comprises a laser module carried internally of said body and constructed and arranged to generate and emit a laser beam, a power source including electrical batteries carried internally of said body and electrically connected to said laser module by a power circuit to provide electrical power to said laser module when said circuit is closed, and a manually operable power switch carried on said body and coupled with said circuit and constructed and arranged to permit a user to selectively close and open said circuit to thereby turn said laser module on and off.

* * * * *